United States Patent [19]

van der Schoot

[11] Patent Number: 4,917,559
[45] Date of Patent: Apr. 17, 1990

[54] METHOD AND APPARATUS OF LOADING OR UNLOADING A PLURALITY OF STACKS OF TRAYS FROM A CONTAINER

[75] Inventor: Jelle van der Schoot, Aalten, Netherlands

[73] Assignee: Staalkat B.V., Netherlands

[21] Appl. No.: 270,590

[22] Filed: Nov. 14, 1988

[51] Int. Cl.$^4$ .................. B65G 59/02; B65G 67/24
[52] U.S. Cl. ............................ 414/331; 414/786; 414/392; 414/796.6; 414/401
[58] Field of Search .......... 414/331, 373, 389, 390, 414/391, 392, 394, 396, 399, 401, 403, 416, 375, 626, 225, 786, 795.6, 796, 796.2, 796.3, 796.6, 277, 281, 282, 286; 901/16

[56] References Cited

U.S. PATENT DOCUMENTS

| | | | |
|---|---|---|---|
| 2,535,961 | 12/1950 | Schutt | 414/286 X |
| 2,624,470 | 1/1953 | Geist | 414/286 X |
| 3,075,656 | 1/1963 | Pearne | 414/391 X |
| 3,637,095 | 1/1972 | Kampfer | 414/373 X |
| 4,323,169 | 4/1982 | Guigan | 414/796.6 |
| 4,597,707 | 7/1986 | Cornacchia | 901/16 X |
| 4,634,333 | 1/1987 | Butterfly, Jr. et al. | 414/331 |
| 4,782,567 | 11/1988 | Kanaya et al. | 414/416 X |

FOREIGN PATENT DOCUMENTS

| | | | |
|---|---|---|---|
| 2020267 | 11/1971 | Fed. Rep. of Germany | 414/796.6 |
| 2562523 | 10/1985 | France | 414/331 |
| 2587692 | 3/1987 | France | 414/626 |
| 2106070 | 4/1983 | United Kingdom | 414/331 |

Primary Examiner—Robert J. Spar
Assistant Examiner—Robert S. Katz
Attorney, Agent, or Firm—Griffin, Branigan & Butler

[57] ABSTRACT

A method and apparatus of unloading a container having shelves at different levels, each shelf being filled with at least three adjacent stacks of trays filled with a product, such as eggs. The container is comprised of four vertical angle sections connected by horizontal sections which support the stack carrying shelves. The middle stack of trays is always removed first, after loosening that stack by moving it slightly sideways to prevent jamming with the outer adjacent stacks of trays. In one embodiment, a fork-shaped unloading device is used for the unloading, which device can be inserted under tunnel-shaped openings of the lowermost tray of a stack of trays, and the points of which are provided with switch elements or sensors to sense the edge of the shelf. A beam, with electromagnets, is used to lift a superadjacent shelf so that stacks of trays can be unloaded from a subadjacent shelf.

24 Claims, 3 Drawing Sheets

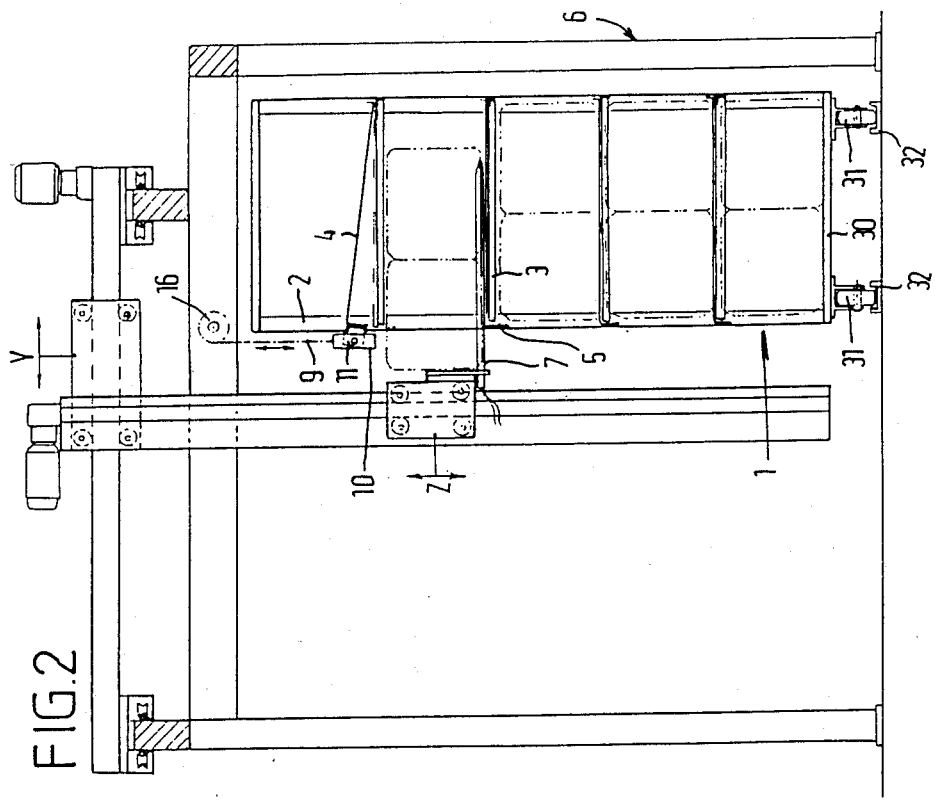
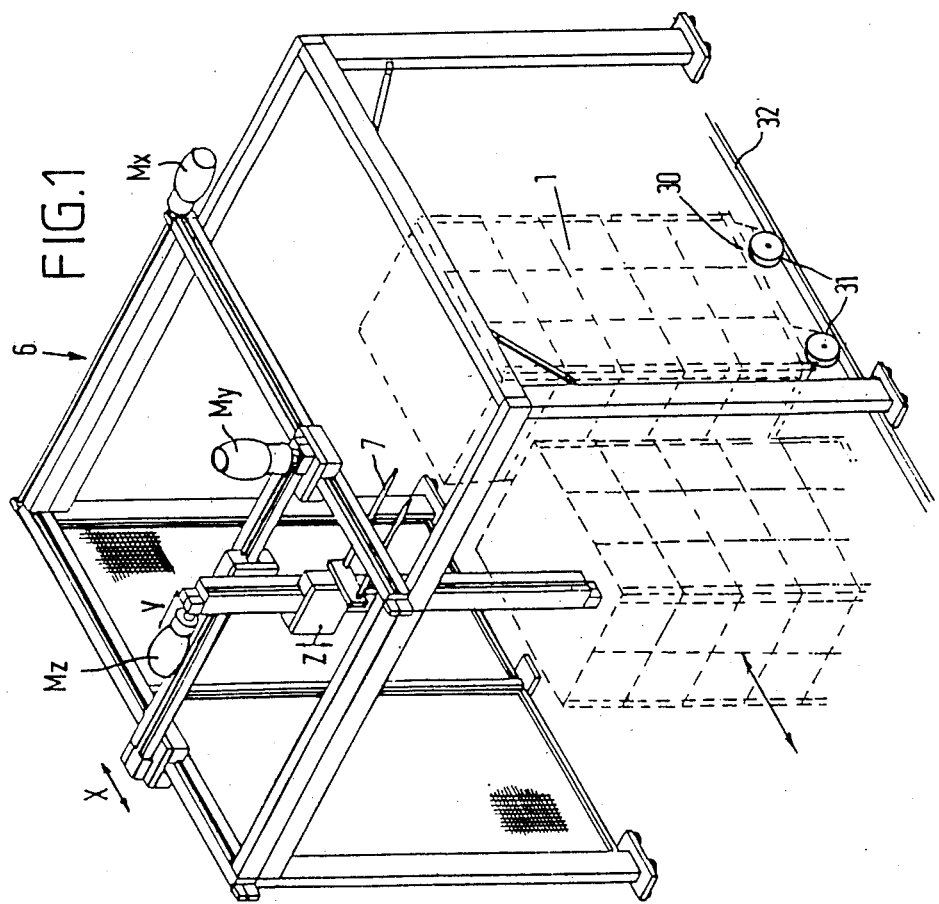

METHOD AND APPARATUS OF LOADING OR UNLOADING A PLURALITY OF STACKS OF TRAYS FROM A CONTAINER

This invention relates to a method of unloading a container having different floor levels, each filled with a plurality of stacks of filled trays, disposed in side-by-side relationship, said container being essentially comprised of four vertical angle sections which by means of horizontal connecting sections support stack carrying plates or shelves.

A method of this kind, and apparatus for performing the method are described in Netherlands patent application 81,04384 and the corresponding British patent 2,106,070. In that prior arrangement a plurality of side-by-side trays are shifted by means of a pushing member from stack carrying plates onto a discharging belt, essentially consisting of a plurality of stack carrying platforms, and disposed next to the container opposite the pushing member.

In the prior device, the stack carrying plates of each container are provided with an edge to reinforce the front of these plates. In order that a stack may be pushed off a stack carrying plate by means of the pushing member, the plate located above it must first be moved upwards, lest the stack to be unloaded contacts the edge of the superjacent carrying plate or platform.

The prior arrangement is unsatisfactory as a result of the fact that the trays are often damaged, and also the apparatus is found to be unable to cope with different sizes of trays, resulting in faulty handling and misalignment of the trays during transfer, with all results of that.

It is an object of the present invention to improve the method to be carried out with said prior apparatus.

To this effect, the present invention provides a method of unloading containers having different floor levels, each filled with a plurality of stacks of filled trays, which is characterized in that, during the unloading of the various floor levels the container is not moved, and that at a given floor level carrying at least three adjacent stacks the middle one or ones of the stacks standing next to each other or one behind the other is or are always removed first, after loosening such stack or stacks by moving it or them sideways a little bit to prevent jamming.

One embodiment of the present invention is characterized by using for the unloading a fork-shaped unloading device which can be inserted under tunnel-shaped openings of the lowermost of a stack of trays, and the points of which are provided with switch elements or sensors. These sensors can cooperate, by vertical sensing, with plate or shelf edges varying in height per container.

In a further elaboration of the present invention, with the container being still filled, and once per container discharged, the correct stack carrying shelf positions are determined and also the width and possible oblique position of the container are determined by means of sensing, using an auxiliary device provided with switch elements or sensors, which auxiliary device is temporarily coupled to the unloading device. The auxiliary device can be used independently of the unloading device to raise the loose stack carrying plates above the floor level to be unloaded. Such raising or lifting can be effected by means of, and after, magnetically engaging the stack carrying plate concerned.

In a further elaboration of the invention, after being unloaded, the stacks are transferred from the fork to a conveyor track or buffer track, which at the point of transfer has one or more interruptions through which the fork is moved down after the transfer.

As the stacks are unloaded from a container one after the other, it is possible, and in accordance with a further elaboration of the present invention, for the stacks to be unloaded from two or more containers in a programmed order so that different lots may be mixed.

One embodiment of the invention will now be described by way of example, with reference to the accompanying drawings. In said drawings, FIG. 1 shows a perspective view of a container unloader for carrying out the method according to this invention, omitting a part thereof, namely, the lifting mechanism for the track carrying plates or shelves;

FIG. 2 shows a side-elevational view of the apparatus shown in FIG. 1;

Figure 3:
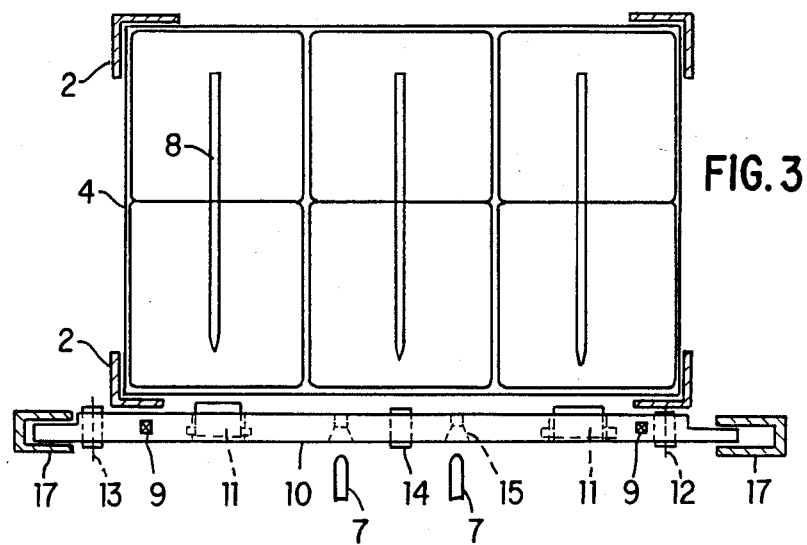
FIG. 3 shows a diagrammatic top plan view of a part of the apparatus shown in FIGS. 1 and 2.
Figure 4:
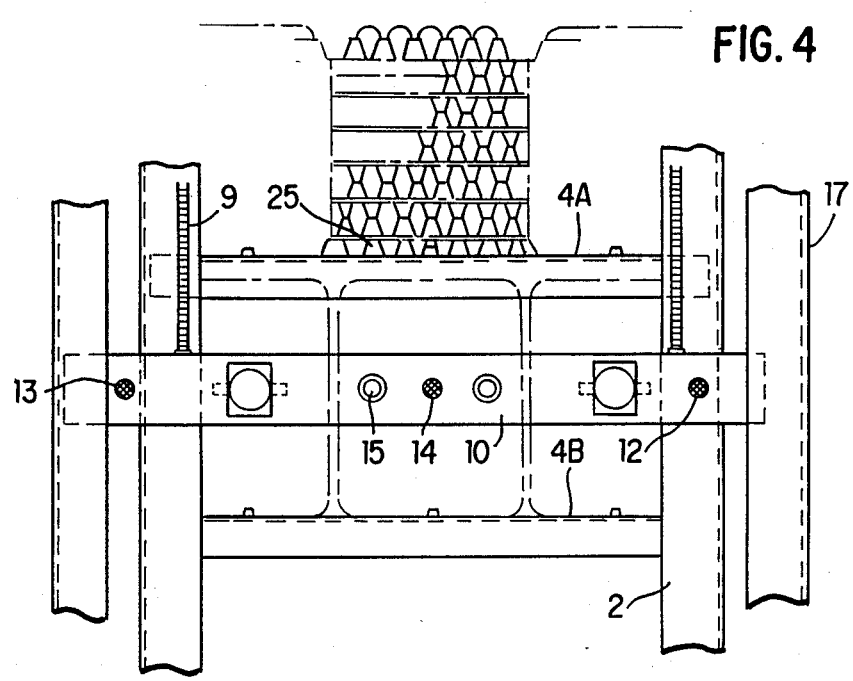
FIG. 4 shows a front elevational view of the apparatus illustrated in FIG. 3.
Figure 5A:
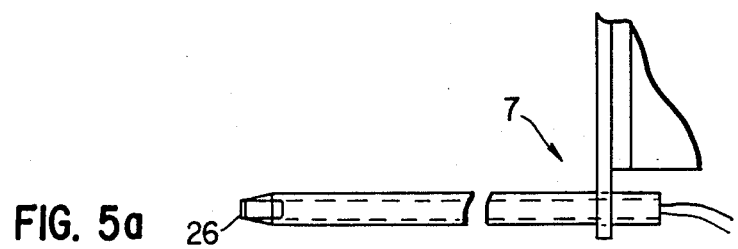
Figure 6:
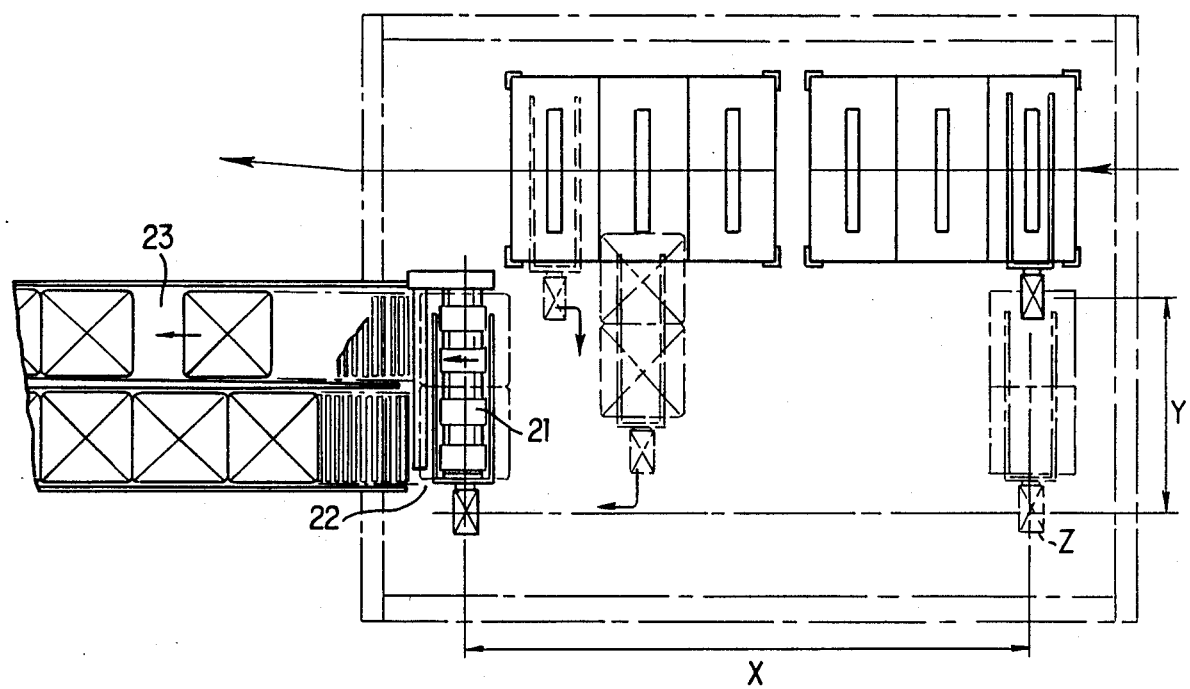
Figure 7:
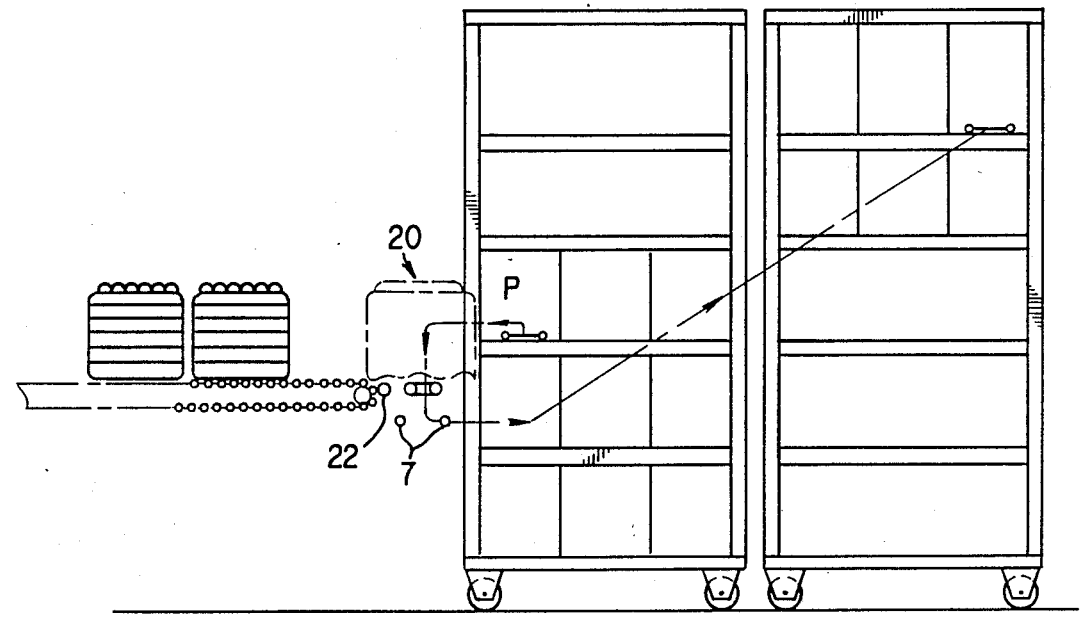

FIGS. 5a and b show details of two possible embodiments of the forks used in the apparatus of FIGS. 1-4;

FIG. 6 is a top plan view showing a container unloader and a discharge belt; and FIG. 7 shows a front elevational view of the apparatus shown in FIG. 6.

Referring to the drawings, there is shown a container unloader substantially consisting of a portal manipulator 6 (see FIG. 1), having a stack gripping member or fork 7, which can move in three essentially perpendicular directions, namely X, Y and Z directions indicated with double arrows in FIG. 1. These partial movements are independent of each other and freely programmable and controllable by means of three motors $M_x$, $M_y$ and $M_z$.

As further shown in the drawings (FIG. 2), each container 1 essentially consists of four vertical angle sections 2 which by means of connecting sections 3 are interconnected. Supported on the connecting sections 3 are stack carrying plates 4. The angle sections 2 are secured at the lower end to a bottom section 30 mounted on wheels 31, which at the portal manipulator 6 can be moved through rails 32, secured to the floor at a correct position relative to portal manipulator 6.

As shown in the drawings, the stack carrying shelves or plates 4 are provided at the front with a downwardly bent edge 5. This edge serves to impart rigidity to the plate, but at the same time prevents the stacks from being removed from the container without more ado. In order to remove the stacks from the container, the shelf located above the stack of trays to be removed should be lifted, so that the edge 5 is moved out of the way. In order that the stacks of trays may be properly positioned on the carrying plate or shelf, the latter is provided with guiding strips 8.

The mechanism by which the stack carrying trays 4 can be lifted consists of two chains 9 (see FIG. 2; the scanning mechanism has been omitted from FIG. 2 for clarity), which chains are each disposed at the front of a container. Mounted on chains 9 is a horizontal beam 10 with electromagnets 11 thereon (also see FIGS. 3 and 4). Beam 10 can be moved up and down in guides 17 by means of a driving mechanism 16. By lowering beam 10 in front of a plate edge, actuating the electromagnets, and lifting the beam again, the carrying plate concerned can be lifted. When the subjacent carrying plate has been unloaded, the beam will lower the carrying plate again, release it and be lowered further to the next carrying plate to be lifted.

In order to determine the location of a stack of trays and that of the plate carrying the stack, use is made of a scanning mechanism which is fixedly secured to the plate lifting mechanism. To this effect the beam 10 of the plate lifting mechanism is provided with proximity switches 12, 13, 14 and holes 15 for permitting the passage of fork prongs 7 forming the actual lifting mechanism. By engaging beam 10 with the fork 7 and moving it to left and right, the container width and container misalignment are measured on the X-axis by means of proximity switches 12, 13 and encoders not shown. When the fork carrying the beam is then moved upwards, the plate position switch 14 will detect the underside of the uppermost plate 4a (see FIG. 4) at a given moment. A reading of the position of the encoders of the Z-axis then determines the absolute position of the underside of the uppermost plate 4a. By moving beam 10 further upwards, the upper edge of plate 4a can be found in the same manner. Thus the plate edge and the plate pitch are also approximately known. Subsequently, the fork will re-set beam 10 to the inoperative position and release it. The plate lifting mechanism will then wait in the rest position until the uppermost carrying plate has been unloaded and has to be lifted.

By means of the "coarsely"-determined position of the underside of the edge of the shelf 4a, the apparatus can now find the top of plate 4b by positioning itself below the edge of shelf 4b and then, by moving slowly upwardly, accurately determining the position of the top of shelf 4b by means of a sensor 26 or the like, which will be described in more detail hereinafter. By means of the shelf pitch, i.e. the perpendicular distance between the shelves, thus coarsely determined, and the accurate position of the edge of shelf 4a, shelf 4b can be found. When this shelf edge is also accurately known, the shelf pitch is thus also accurately known, and the procedure can be continued to determine the subjacent shelf positions.

Referring now to FIGS. 6 and 7, there is shown a deposition station 20. Arranged in this station are a set of continuously travelling conveyor belts 21, with one or two slots 22 between them, through which the fork prongs 7 can be lowered to deposit the stacks of trays. Immediately after being deposited, the stacks of trays are removed from the deposition station to a discharge or buffer conveyor 23 to clear the deposition station for a next stack of trays.

The stacks of trays are picked up from the container by means of fork prongs or tines 7, namely, by inserting the prongs into tunnel-shaped openings 25 of the lowermost tray, lifting the stack somewhat and taking it out.

As noted hereinbefore, for an accurate position finding, use is made of a beam 10 provided with proximity switches. Beam 10 is displaced by means of fork 7.

Figure 5B:
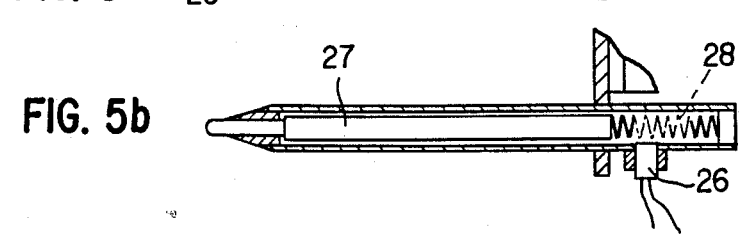

For this purpose the two points of the fork are provided with a switch element or sensor 26, actuated when an article approaches or touches it. This switch element may be a proximity switch 26 in the end face of the prong (as shown in FIG. 5a) or a spring-urged pin 27 which when touched by a shelf is moved against the action of a spring 28 and when passing a switch 26 actuates the latter (as shown in FIG. 5b).

The fork 7 is now set in a position slightly lower than the upper edge of the shelf. As a detection of this position it is presumed that when the fork is displaced in the direction of the container, the fork points come in front of the edge of the shelf. Owing to the width (height) of the depending edge of the shelf, this positioning need not be too accurate. The fork is now moved in the direction of the shelf (i.e. in the Y-direction) until the resilient pins 27 detect the shelf. Thereafter the fork is moved upwards (in the z-direction) until the shelf is no longer detected. The fork is now just above the shelf. The fork is now moved in the direction of the stacks (in the Y-direction) and thus comes to lie underneath the stacks of trays concerned. The stacks are subsequently lifted somewhat in connection with the guide strip on the shelves. When it is the middle stacks of trays which are handled, there now follows a to-and-fro movement to push the outermost stacks of trays gently aside, wherafter the stacks can be taken out of the container. In the case of the outermost stacks of trays, there follows a movement to the middle of the container to avoid touching the angle sections 2.

When the fork 7 carrying stacks of trays is taken out of the container, the fork moves to a "rest" position to wait until the deposition station 20 is cleared. If this is already the case at the beginning of the movement of the fork from the container, the fork should go right to the deposition station and skip the rest position.

When the stacks have been placed on the deposition station, the fork should be moved downwards in a continuous movement and thence by the shortest route to a next stack of trays.

In the portal manipulator 6 described, two or more containers can be accommodated and unloaded alternately in accordance with a pre-determined program. This is shown by way of example in FIG. 7, in which two stacks have been removed from the position designated by P in the left-hand container, and deposited on deposition station 20, whereafter the fork moves from below the deposition station to the right-hand container to collect the next stack of trays. There is thus created a possibility of mixing lots of different origins, which is often desirable with sorting and packaging plants, because eggs from a given farm will often all fall in the same classes, resulting in overloading of this class during further processing. By mixing eggs from different farms, which belong to different classes, the sorting and packaging equipment can be uniformly loaded.

It will be clear that a large number of modifications are possible within the scope of the inventive concept. Furthermore it will be understood that it is possible to use the apparatus described herein for loading trays into a container.

What I claim is:

1. A method of unloading stacks of trays from a movable storage container therefor, comprising:
   (1) providing a movable storage container having vertically disposed supports and a plurality of horizontally disposed sections connecting said supports and forming a plurality of horizontally disposed shelves having a front side and which are positioned at different vertical levels of said container for holding on each shelf at least three laterally adjacent stacks of trays;
   (2) moving an unloading means to the top of the front side of a first shelf to be unloaded and horizontally inserting the unloading means under a lowermost tray of the middle stack of trays in the said at least three adjacent stacks of trays;

(3) moving said middle stack of trays sufficiently laterally to loosen said middle stack from said adjacent stacks; and (4) horizontally removing said middle stack from said front side of the shelf of the said container.

2. The method of claim 1 wherein each shelf is provided at the front side thereof with a downwardly bent edge, whereby stacks of trays on the next under shelf are prevented from being removed from the container while said edge is so positioned and, prior to removing said middle stack of trays, a next above shelf is lifted upwardly to provide a clearance between the said edge and the top of the said middle stack.

3. The method of claim 2 wherein a shelf lifting means is moved vertically adjacent said container, the lifting means is contacted with the said next above shelf and lifts the said next above shelf to provide said clearance.

4. The method of claim 3 wherein the width of the said container is determined by moving said lifting means laterally and detecting means disposed near each end of the lifting means detects ends of the said container.

5. The method of claim 4 wherein the unloading means is engaged with said lifting means and said unloading means is moved laterally with, in turn, moves said lifting means laterally for detecting the width of the container.

6. The method of claim 4 wherein the said detecting means are proximity switches disposed near each end of the lifting means.

7. The method of claim 3 wherein the said lifting means has electromagnets and the said lifting means is contacted with said edge, made of metal, of the said next above shelf by actuating said electromagnets.

8. The method of claim 5 wherein the unloading means is fork-shaped with at least two forks, the lifting means is in the form of a beam with apertures for receiving the said forks and said beam is moved by moving the forks of the unloading means.

9. The method of claim 1 wherein the unloading means is fork-shaped having at least two forks and at least the lowermost tray of said middle stack has tunnel-shaped openings in a lower portion thereof, and said fork-shaped unloading means is moved into said openings for moving and removing said middle stack.

10. The method of claim 9 wherein the ends of the forks have sensing means and the forks are slowly moved vertically along the said edge of the shelf until the sensing means determines that the ends of the forks have cleared the upper edge of the shelf and are thus positioned for inserting under the said lowermost tray.

11. The method of claim 1 wherein after said middle stack is removed, that stack is moved by said unloading means to a buffer track for receiving the said stack.

12. The method of claim 1 wherein after removal of said middle stack a said adjacent stack is removed.

13. The method of claim 12 wherein stacks are removed from two or more containers in a preselected order such that different lots of stacks contained in the said containers may be mixed at a buffer track.

14. Apparatus for unloading stacks of trays from a movable storage container, comprising:

(1) a storage container having vertically disposed supports and a plurality of horizontally disposed sections connecting said supports and forming a plurality of horizontally disposed shelves that are positioned at different vertical levels of said container for holding on each shelf at least three laterally adjacent stacks of trays;

(2) unloading means for unloading a stack of trays from said container and having a configuration such that the unloading means is capable of being inserted under a lowermost tray of the middle stack of said trays of said three adjacent stacks of trays and supporting that middle stack of trays;

(3) unloading moving means for moving said unloading means; and (4) control means for controlling the movement of the unloading means such that the unloading means is movable;
  (a) vertically adjacent said container such as to place said unloading means at the top of a first shelf to be unloaded;
  (b) horizontally forward such as to insert said unloading means under said lowermost tray of said middle stack of trays;
  (c) laterally such as to loosen said middle stack of trays from said adjacent stacks so that the middle stack of trays is removable without interference from the other stacks of trays of the said three adjacent stacks of trays;
  (d) vertically to slightly elevate the stack of trays from the shelf; and
  (e) horizontally backwards such as to remove said middle stack of trays from said container.

15. The apparatus of claim 14 wherein each shelf is provided at the front side thereof with a downwardly bent edge, whereby stacks of trays on the next under shelf are prevented from being removed from the container while said edge is so positioned and wherein the apparatus has shelf lifting means for lifting a next above shelf upwardly to provide a clearance between the said edge and the top of the middle stack.

16. The apparatus of claim 15 wherein the shelf lifting means is movable vertically adjacent said container and the lifting means is contactable with the said next above shelf for lifting the said next above shelf to provide said clearance.

17. The apparatus of claim 16 wherein said lifting means is laterally movable and the lifting means has detecting means disposed near each end thereof whereby the width of the said container is determined by moving said lifting means laterally and detecting the ends of the said container.

18. The apparatus of claim 17 wherein the unloading means is engagable with said lifting means and said unloading means is movable laterally for moving said lifting means laterally and detecting the width of the container.

19. The apparatus of claim 17 wherein the said detecting means are proximity switches disposed near each end of the lifting means.

20. The apparatus of claim 16 wherein the said lifting means has electromagnets and the said lifting means is contactable with said edge, made of metal, of the said next above shelf by actuating said electromagnets.

21. The method of claim 18 wherein the unloading means is fork-shaped with at least two forks, the lifting means is in the form of a beam with apertures for receiving the said forks and said beam is movable by moving the forks of the unloading means.

22. The apparatus of claim 14 wherein the unloading means is fork-shaped having at least two forks and at least the lowermost tray of said middle stack has tunnel-shaped openings in a lower portion thereof, and said fork-shaped unloading means is movable into said openings for moving said removing said middle stack.

23. The apparatus of claim 22 wherein the ends of the forks have sensing means and the forks are slowly vertically movable along the said edge of the shelf until the sensing means determines that the ends of the forks have cleared the upper edge of the shelf and are thus positioned for inserting under the said lowermost tray.

24. The apparatus of claim 14 wherein the unloading moving means is also capable of moving said unloading means such as to remove the middle stack to a buffer track for receiving the said stack.

* * * * *